US012636807B2

(12) United States Patent
Ji

(10) Patent No.: US 12,636,807 B2
(45) Date of Patent: May 26, 2026

(54) SECONDARY BATTERY ELECTRODE NOTCHING APPARATUS

(71) Applicant: SAMSUNG SDI CO., LTD., Yongin-si (KR)

(72) Inventor: Hyeong Min Ji, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 111 days.

(21) Appl. No.: 18/626,415

(22) Filed: Apr. 4, 2024

(65) Prior Publication Data

US 2025/0128445 A1     Apr. 24, 2025

(30) Foreign Application Priority Data

Oct. 19, 2023     (KR) ......................... 10-2023-0140317

(51) Int. Cl.
B26F 1/12 (2006.01)
H01M 4/04 (2006.01)
(52) U.S. Cl.
CPC .............. B26F 1/12 (2013.01); H01M 4/043 (2013.01)
(58) Field of Classification Search
CPC .............. B26F 1/14; B26F 1/12; H01M 4/043
See application file for complete search history.

(56) References Cited

U.S. PATENT DOCUMENTS 4,166,403 A  *  9/1979  DiDonato, Jr. ...... B21D 45/006
                                                      83/13
2021/0086388 A1*  3/2021  Lee ......................... H01M 4/04

FOREIGN PATENT DOCUMENTS

| | | | | | |
|---|---|---|---|---|---|
| CN | 108943119 A | * | 12/2018 | ............... | B26D 9/00 |
| EP | 1384535 A1 | * | 1/2004 | ........... | B21D 45/006 |
| JP | H05104167 A | * | 4/1993 | | |
| JP | H05248423 A | * | 9/1993 | ........... | B23P 19/062 |
| JP | H08117902 A | * | 5/1996 | | |
| JP | H08141992 A | * | 6/1996 | ............ | B28B 11/12 |
| JP | 2001110409 A | * | 4/2001 | | |

OTHER PUBLICATIONS

CN_108943119_A (Year: 2018).*
JP_08117902_A (Year: 1996).*
JP_2001110409_A (Year: 2001).*
JP_H05104167_A (Year: 1993).*
JP_H05248423_A (Year: 1993).*
JP_H08117902_A (Year: 1996).*
JP_H08141992_A (Year: 1996).*

* cited by examiner

*Primary Examiner* — Jonathan G Riley
(74) *Attorney, Agent, or Firm* — Lee IP Law, P.C.

(57)                    ABSTRACT

A secondary battery electrode notching apparatus, including a die configured to support a secondary battery electrode including a composite portion coated with an electrode active material and an uncoated portion not coated with the electrode active material; a composite portion stripper configured to move toward the die and press the composite portion into close contact with the die; an uncoated portion stripper configured to move toward the die, press the uncoated portion into close contact with the die, and including an elastic pad formed of an elastic material and configured to elastically deform to make surface contact with the uncoated portion; and a punch configured to move toward the die and cut the uncoated portion so that scrap for disposal is formed from the uncoated portion.

14 Claims, 12 Drawing Sheets

FIG. 2

THIRD DIRECTION

FIRST DIRECTION

FIG. 4

THIRD DIRECTION

SECOND DIRECTION

VII

VIII

VIII

116

VII

130A

140

120

SECOND
DIRECTION

FIRST
DIRECTION

FIRST
DIRECTION

SECOND
DIRECTION

SECONDARY BATTERY ELECTRODE NOTCHING APPARATUS

CROSS-REFERENCE TO RELATED APPLICATION

The present application claims priority and the benefit of Korean Patent Application No. 10-2023-0140317, filed on Oct. 19, 2023 in the Korean Intellectual Property Office, the entire disclosure of which is incorporated herein by reference.

BACKGROUND

1. Field

The present disclosure relates to a secondary battery electrode notching apparatus.

2. Description of the Related Art

Generally, as the demand for portable electronic products such as laptops, video cameras, and portable phones increases rapidly, and as commercialization of robots and electric vehicles begins in earnest, research on high-performance secondary batteries capable of being repeatedly charged and discharged is actively underway.

The above information disclosed in this Background section is provided for enhancement of understanding of the background of the present disclosure, and, therefore, it may contain information that does not constitute related (or prior) art.

SUMMARY

Embodiments are directed a secondary battery electrode notching apparatus, including a die configured to support a secondary battery electrode including a composite portion coated with an electrode active material and an uncoated portion not coated with the electrode active material; a composite portion stripper configured to move toward the die and press the composite portion into close contact with the die; an uncoated portion stripper configured to move toward the die, press the uncoated portion into close contact with the die, and including an elastic pad formed of an elastic material and configured to elastically deform to make surface contact with the uncoated portion; and a punch configured to move toward the die and cut the uncoated portion so that scrap for disposal is formed from the uncoated portion.

A thickness of the elastic pad may become thinner the further away it may be from the composite portion stripper in a direction parallel to a width direction of the secondary battery electrode.

Wrinkles may be in the uncoated portion; and if the uncoated portion is pressed by the uncoated portion stripper, the wrinkles may move in a direction away from the composite portion stripper in a width direction of the secondary battery electrode within the uncoated portion so that the wrinkles may disappear at an end of the uncoated portion.

A thickness of the elastic pad may become thinner the further away it may be from a center of the uncoated portion stripper in a direction parallel to a longitudinal direction of the secondary battery electrode.

Wrinkles may be in the uncoated portion; and if the uncoated portion is pressed by the uncoated portion stripper, the wrinkles may move to a scrap area, which may become the scrap for disposal, within the uncoated portion.

The wrinkles in the scrap area may be included in the scrap for disposal formed by the punch and removed from the uncoated portion.

The uncoated portion stripper may further include a stripper block, which may be a rigid body, and a spring interposed between the stripper block and the elastic pad.

The spring may include a plurality of springs; the plurality of springs may be spaced apart from each other; and the spring may include a coil spring.

The uncoated portion stripper may further include an elastic pad reinforcement plate supporting one side of the plurality of springs and attached to the elastic pad.

The uncoated portion stripper may include a pair of uncoated portion strippers; the pair of uncoated portion strippers may be spaced apart from each other in a direction parallel to a longitudinal direction of the secondary battery electrode; and the punch may be between the pair of uncoated portion strippers.

The secondary battery electrode notching apparatus may further include a punch support base supporting the composite portion stripper, the uncoated portion stripper, and the punch.

The secondary battery electrode notching apparatus may further include a composite portion stripper support spring between the composite portion stripper and the punch support base; and an uncoated portion stripper support spring between the uncoated portion stripper and the punch support base.

As the punch support base approaches the die, the uncoated portion stripper may press the uncoated portion after the composite portion stripper may press the composite portion.

If the uncoated portion stripper presses the uncoated portion, the uncoated portion stripper may further protrude toward the die by as much as a distance obtained by subtracting a thickness of the uncoated portion from a thickness of the secondary battery electrode, compared to the composite portion stripper.

As the punch support base approaches the die, the punch may be configured to cut the uncoated portion in a state in which the uncoated portion may be pressed by the uncoated portion stripper.

A flat surface on which the secondary battery electrode may be supported may be included on the die, and a stepped punch hole aligned with the punch and recessed in the flat surface may be included in the die.

Aspects of the embodiments provide a method of notching a secondary battery electrode, including supplying a secondary battery electrode including a composite portion coated with an electrode active material and an uncoated portion not coated with the electrode active material to a die portion of a notching apparatus; operating a composite portion stripper of the notching apparatus such that the composite portion stripper moves toward the die and presses the composite portion into close contact with the die; operating an uncoated portion stripper of the notching apparatus including an elastic pad formed of an elastic material such that the uncoated portion stripper moves toward the die, presses the uncoated portion into close contact with the die, and thereby elastically deforms the elastic pad while making surface contact with the uncoated portion; and operating a punch such that the punch moves toward the die and cuts the uncoated portion so that scraps for disposal are formed from the uncoated portion.

BRIEF DESCRIPTION OF THE DRAWINGS

Features will become apparent to those of skill in the art by describing in detail exemplary embodiments with reference to the attached drawings in which:

FIG. 2 is a front view of the secondary battery electrode notching apparatus according to the first embodiment of the present disclosure;

FIG. 4 is a side view of the secondary battery electrode notching apparatus according to the first embodiment of the present disclosure;

FIG. 6 is a bottom view of a punching unit of the secondary battery electrode notching apparatus according to the first embodiment of the present disclosure;

FIG. 7 is an enlarged cross-sectional view of a secondary battery electrode just before the electrode is notched by the secondary battery electrode notching apparatus according to the first embodiment of the present disclosure, along line VII-VII of FIG. 6;

FIG. 9 is a plan view of a secondary battery electrode before loading into the secondary battery electrode notching apparatus according to the first embodiment of the present disclosure;

DETAILED DESCRIPTION

Figure 1:
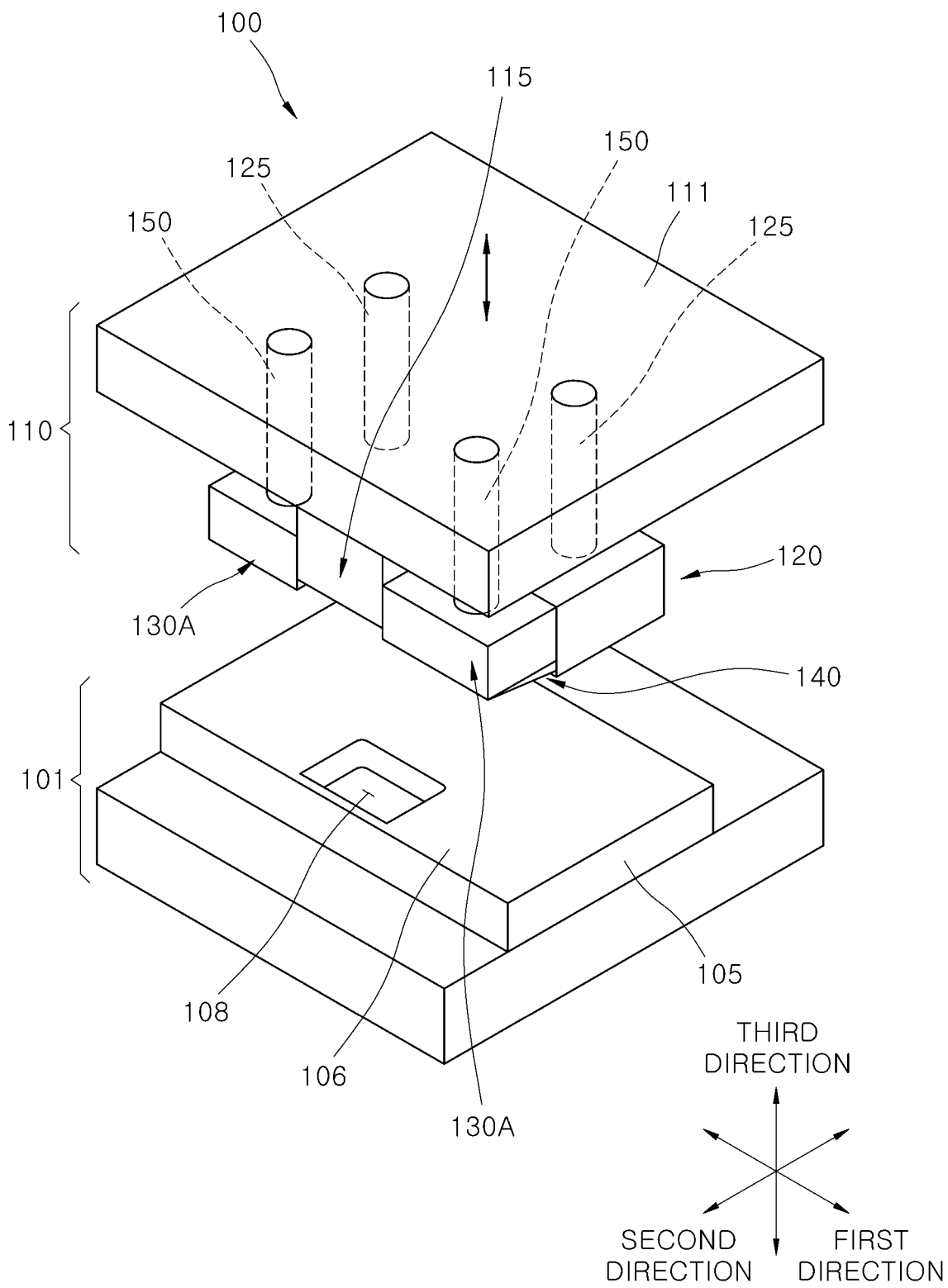
FIG. 1 is a perspective view of a secondary battery electrode notching apparatus according to a first embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Herein, some embodiments of the present disclosure will be described, in further detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term.

It is to be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B, and C," "at least one of A, B, or C," "at least one selected from a group of A, B, and C," or "at least one selected from among A, B, and C" are used to designate a list of elements A, B, and C, the phrase may refer to any and all suitable combinations or a subset of A, B, and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It is to be understood that, although the terms "first," "second," "third," etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (e.g., rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It is to be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

References to two compared elements, features, etc. as being "the same" may mean that they are "substantially the same." Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

When an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

In addition, it is to be understood that when an element is referred to as being "coupled," "linked," or "connected" to another element, the elements may be directly "coupled," "linked," or "connected" to each other, or one or more intervening elements may be present therebetween, through which the element may be "coupled," "linked," or "connected" to another element. In addition, when a part is referred to as being "electrically coupled" to another part, the part may be directly electrically connected to another part or one or more intervening parts may be present therebetween such that the part and the other part are indirectly electrically connected to each other.

Throughout the specification, when "A and/or B" is stated, it means A, B, or A and B, unless otherwise stated. That is, "and/or" includes any or all combinations of a plurality of items enumerated. When "C to D" is stated, it means C or more and D or less, unless otherwise specified.

Figure 2:
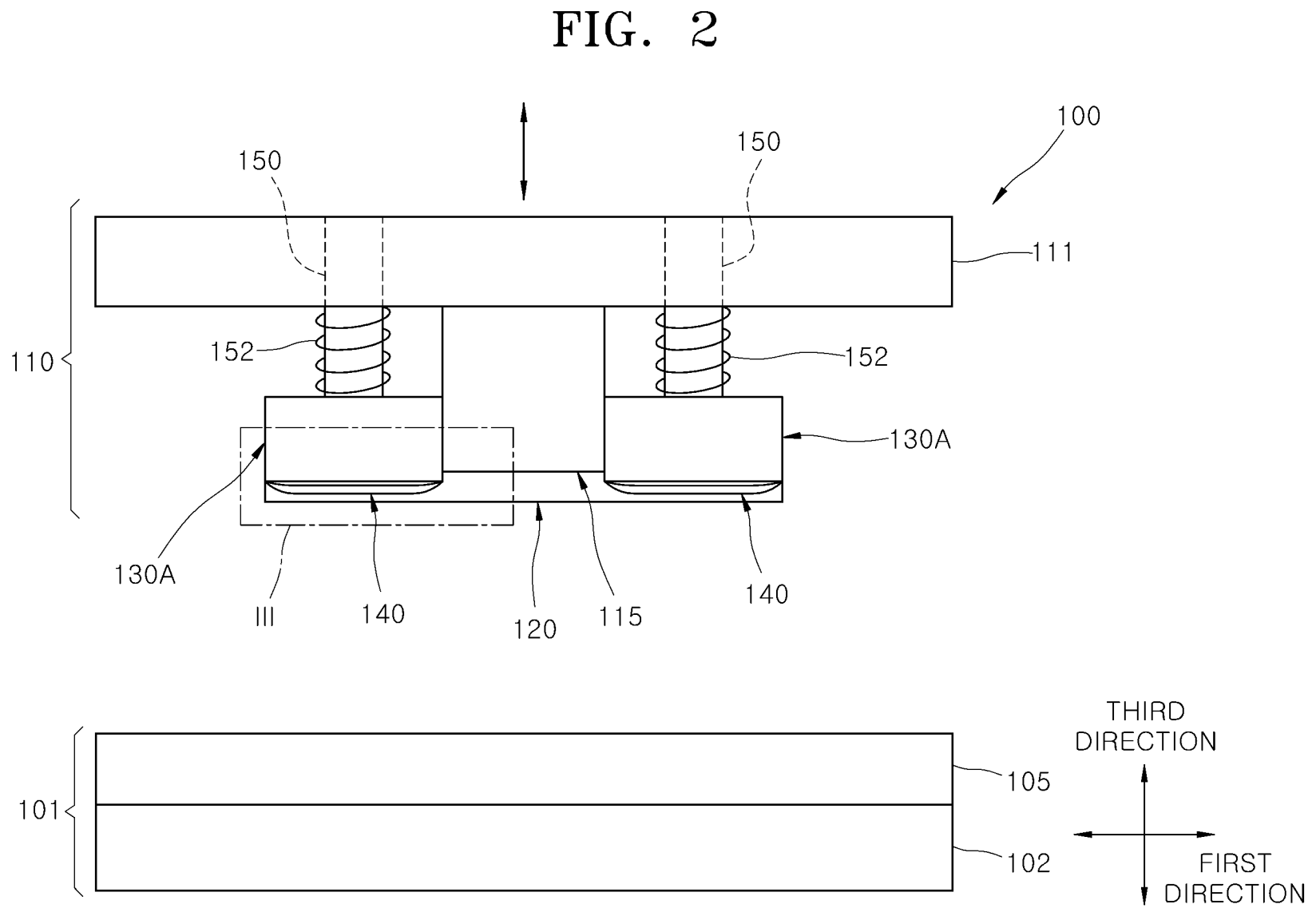
Figure 3:
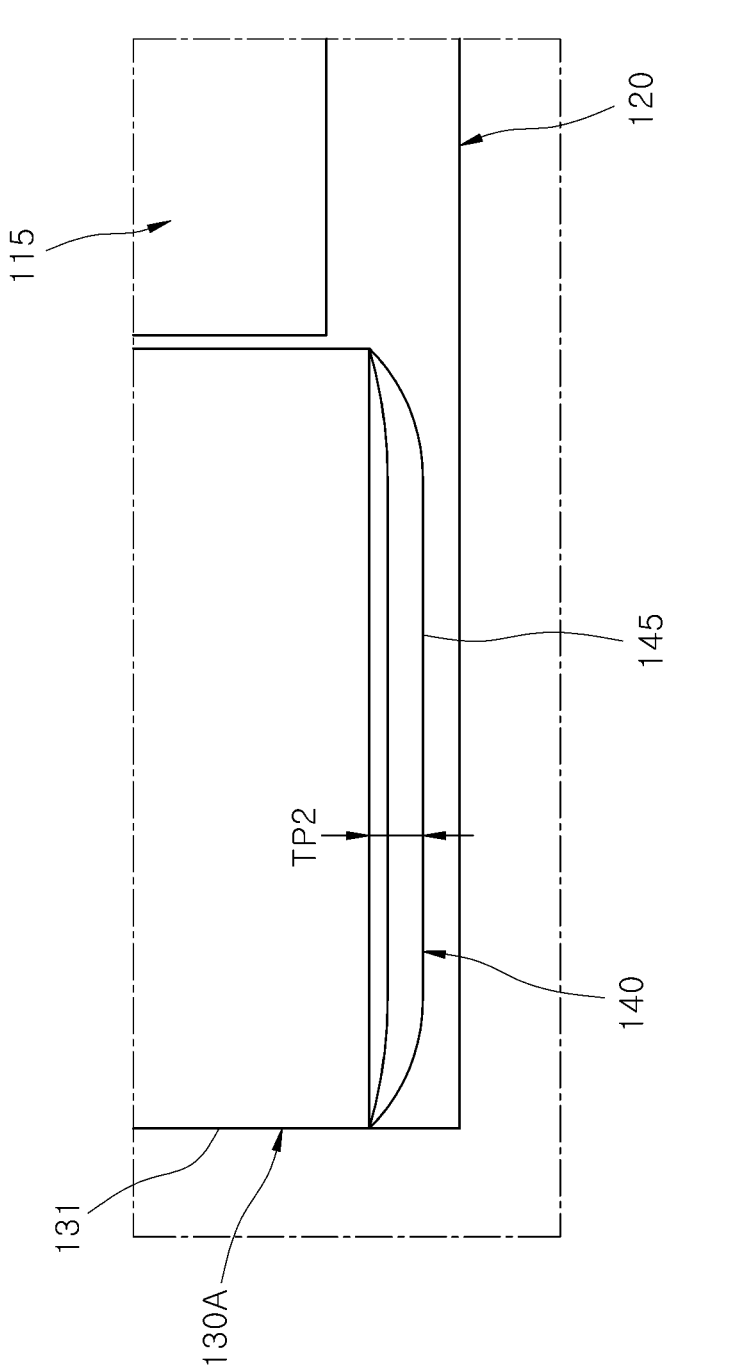
FIG. 3 is an enlarged view of portion III of FIG. 2.
Figure 4:
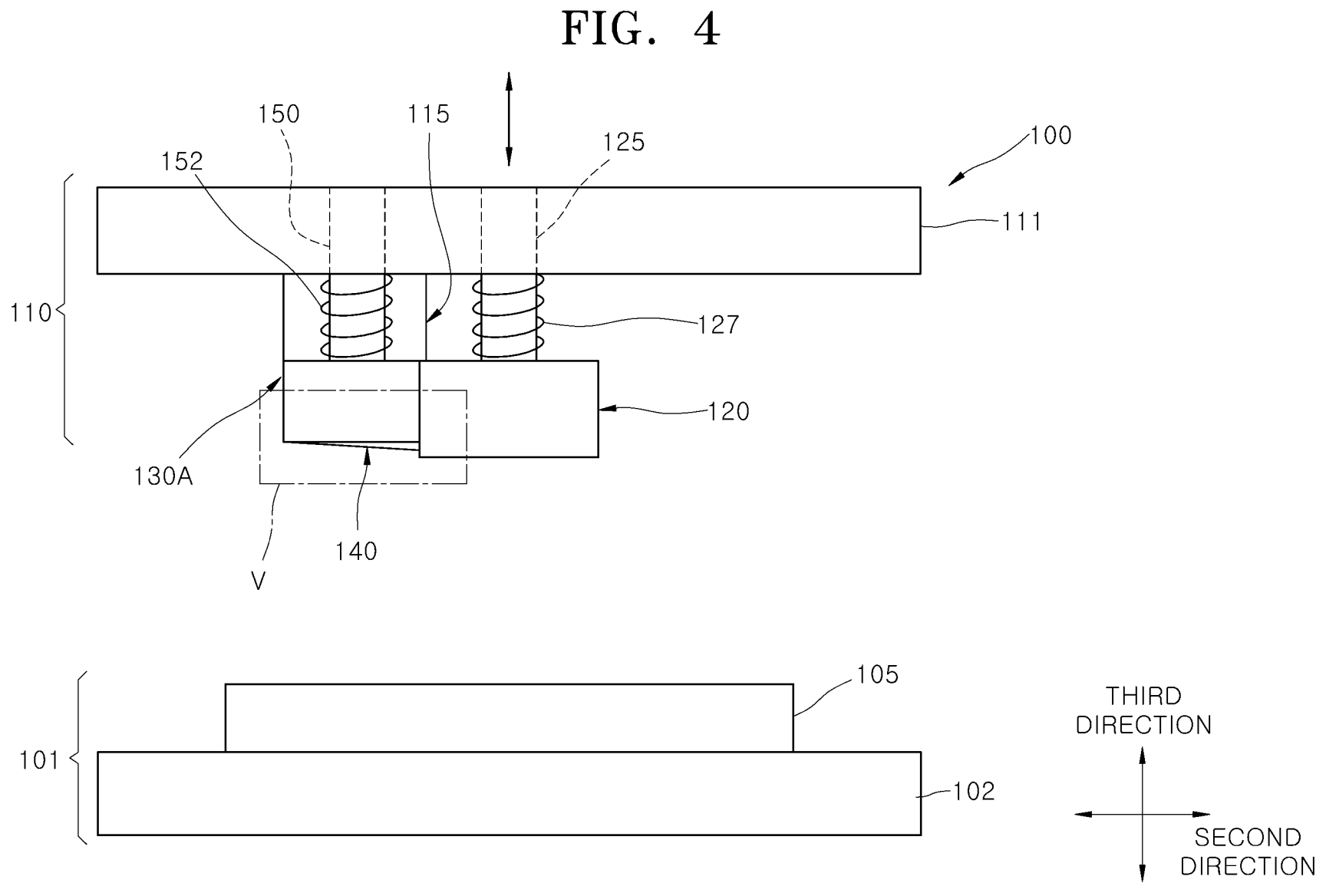
Figure 5:
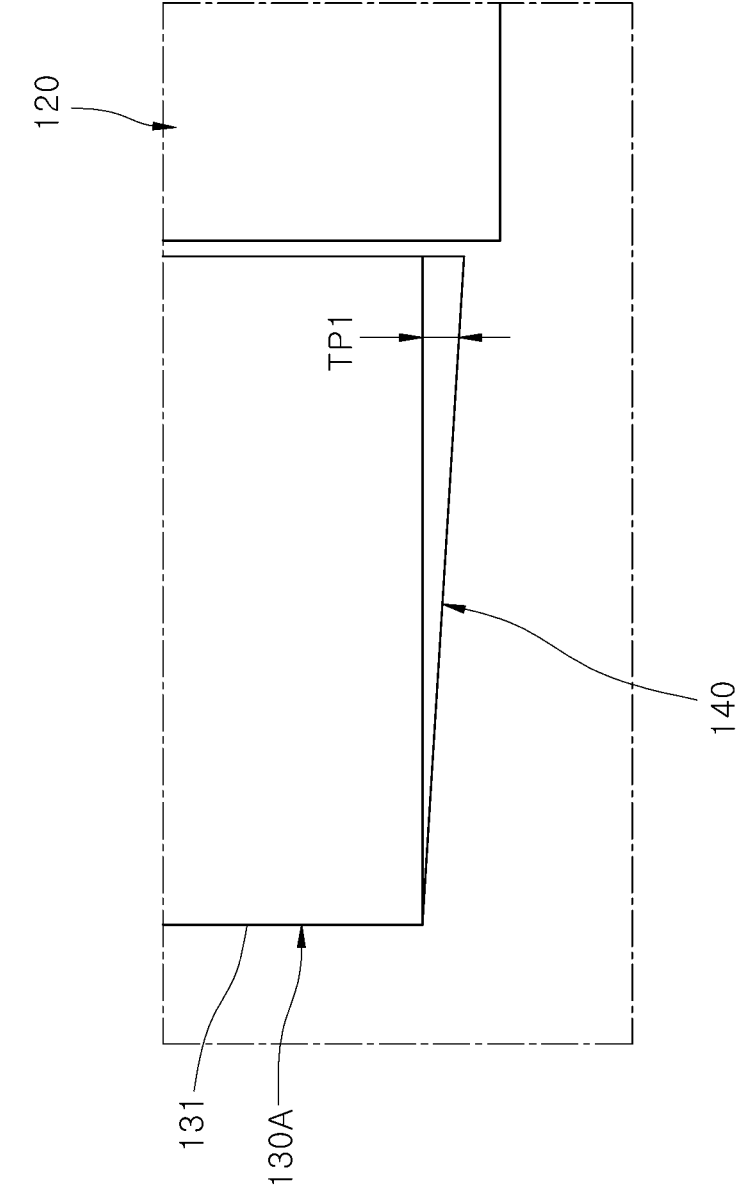
FIG. 5 is an enlarged view of portion V of FIG. 4.
Figure 5:
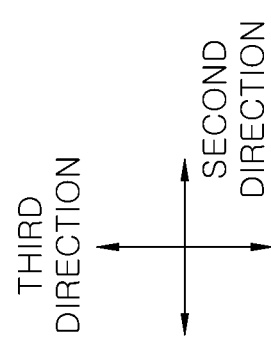
Figure 6:
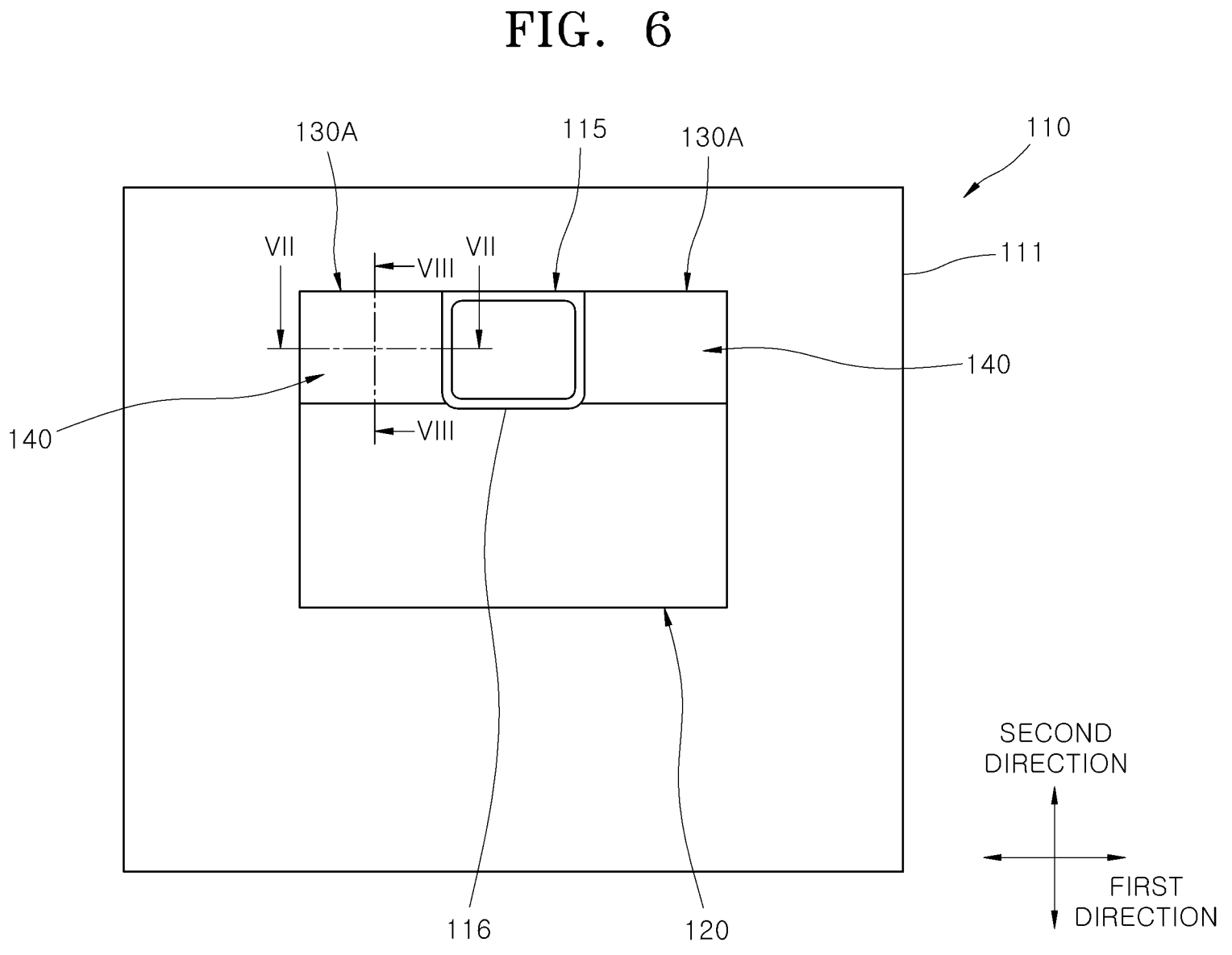
Figure 7:
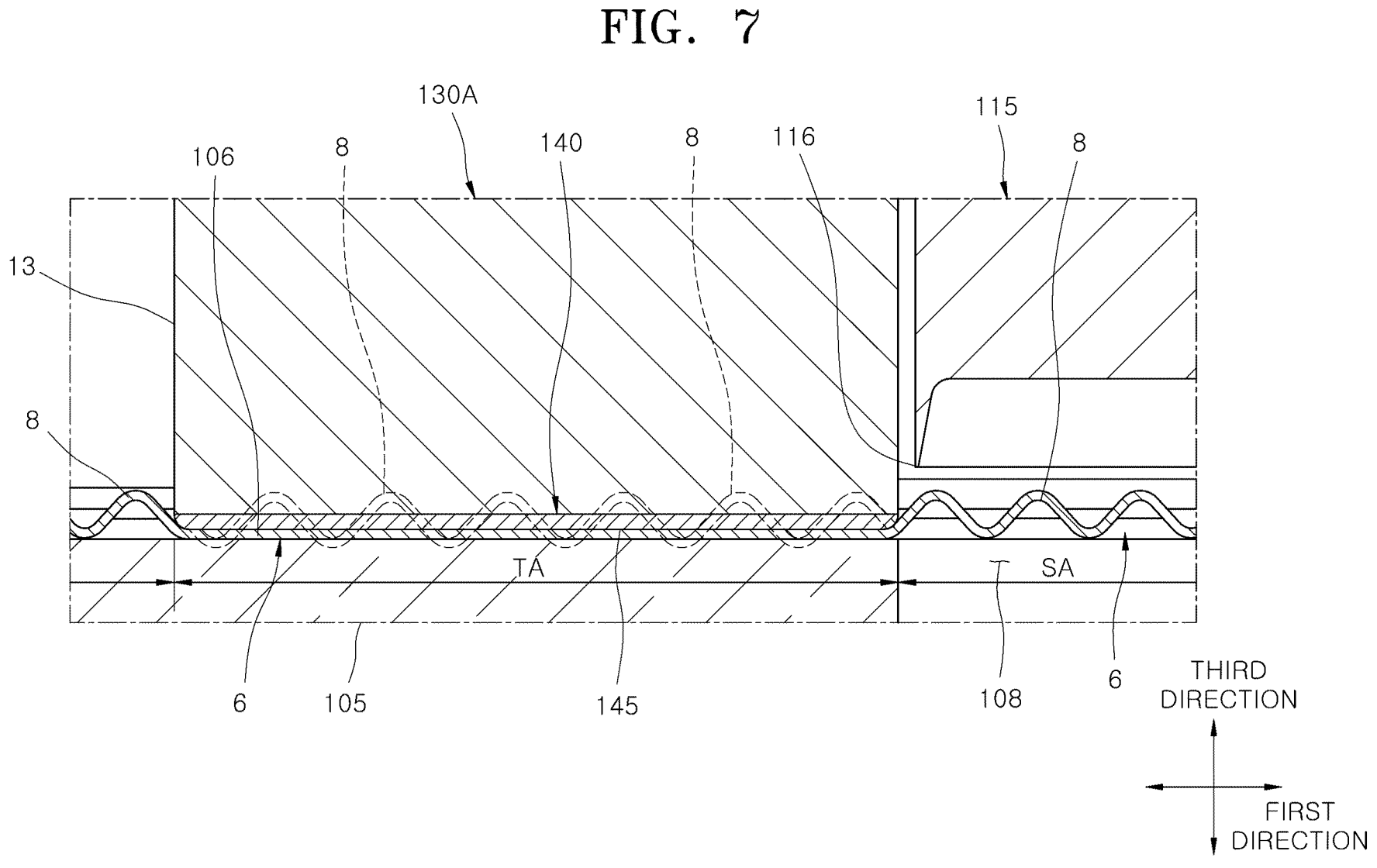
Figure 8:
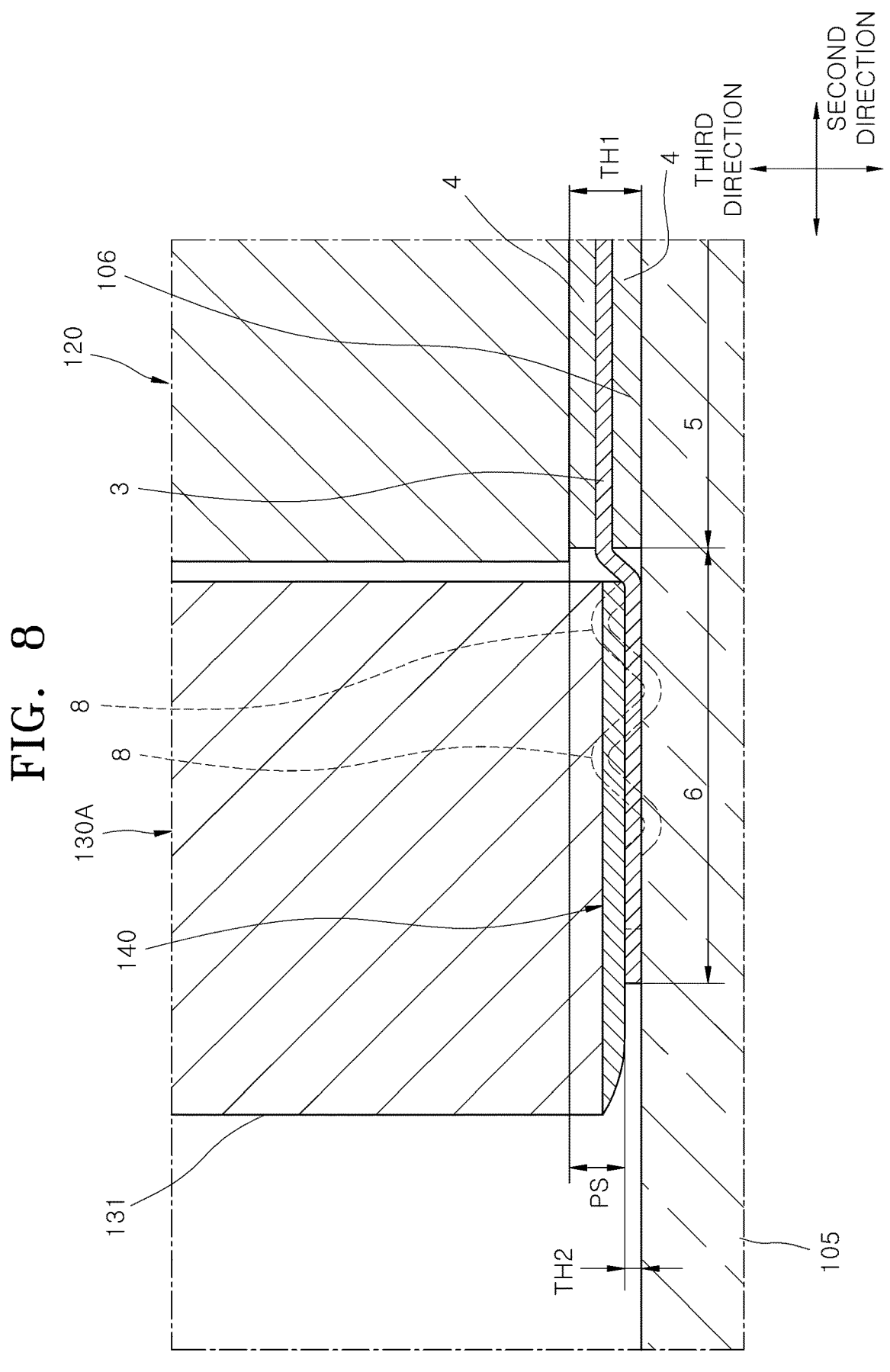
FIG. 8 is an enlarged cross-sectional view of the secondary battery electrode just before the electrode is notched by the secondary battery electrode notching apparatus according to the first embodiment of the present disclosure, along line VIII-VIII of FIG. 6.
Figure 9:
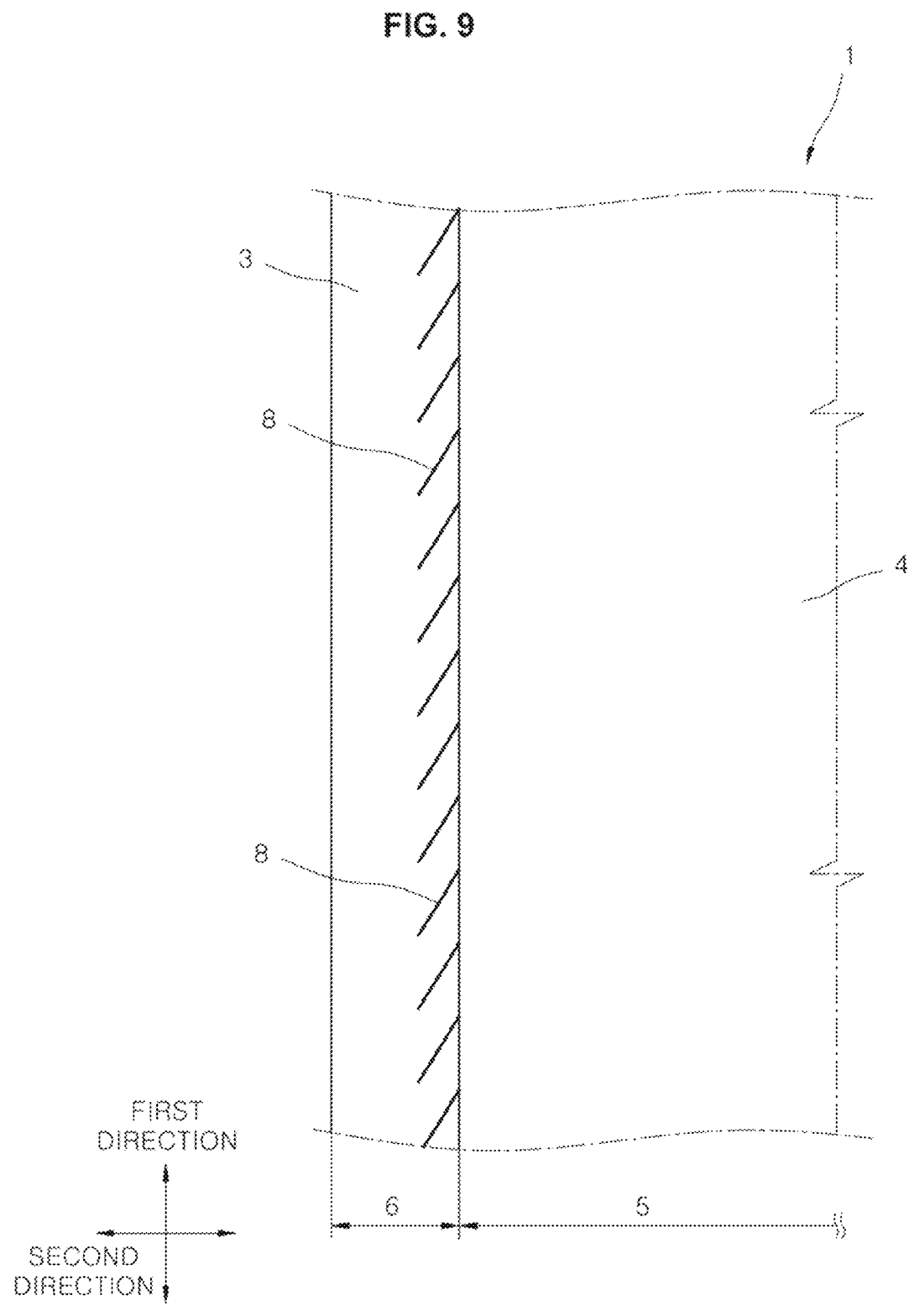
Figure 10:
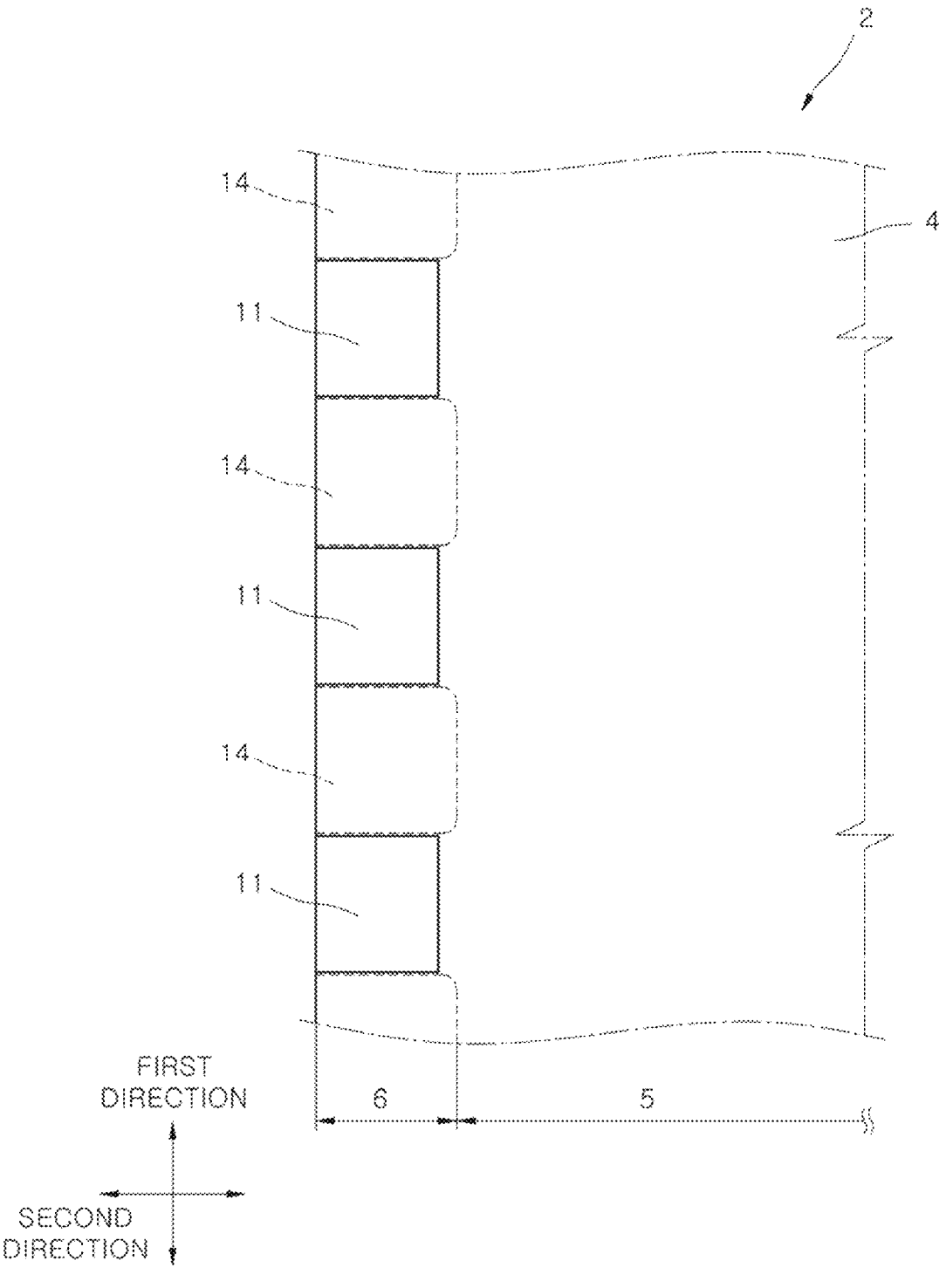
FIG. 10 is a plan view of a secondary battery electrode notched by the secondary battery electrode notching apparatus according to the first embodiment of the present disclosure.

FIG. 1 is a perspective view of a secondary battery electrode notching apparatus according to a first embodiment of the present disclosure, FIG. 2 is a front view of the secondary battery electrode notching apparatus according to the first embodiment of the present disclosure, FIG. 3 is an enlarged view of portion III of FIG. 2, FIG. 4 is a side view of the secondary battery electrode notching apparatus according to the first embodiment of the present disclosure, FIG. 5 is an enlarged view of portion V of FIG. 4, FIG. 6 is a bottom view of a punching unit of the secondary battery electrode notching apparatus according to the first embodiment of the present disclosure, FIG. 7 is an enlarged cross-sectional view of a secondary battery electrode just before the electrode is notched by the secondary battery electrode notching apparatus according to the first embodiment of the present disclosure, along line VII-VII of FIG. 6, FIG. 8 is an enlarged cross-sectional view of the secondary battery electrode just before the electrode is notched by the secondary battery electrode notching apparatus according to the first embodiment of the present disclosure, along line VIII-VIII of FIG. 6, FIG. 9 is a plan view of a secondary battery electrode before loading into the secondary battery electrode notching apparatus according to the first embodiment of the present disclosure, and FIG. 10 is a plan view of a secondary battery electrode notched by the secondary battery electrode notching apparatus according to the first embodiment of the present disclosure.

Referring to FIGS. 1 to 10, the apparatus 100 for notching a secondary battery electrode according to the first embodiment of the present disclosure may include a die 105, a composite portion stripper 120, an uncoated portion stripper 130A, and a punch 115. The die 105 may support secondary battery electrodes 1 and 2. For example, a secondary battery electrode 1 may refer to a secondary battery electrode that has not been notched and a secondary battery electrode 2 may refer to a secondary battery electrode that has been notched.

The secondary battery electrodes 1 and 2 may each include, e.g., an electrode plate 3 including a thin metal foil, and a cured electrode active material 4 with which both sides of the electrode plate 3 may be coated. In an implementation, unlike as shown in FIGS. 7 and 8, only one side of the electrode plate 3 may be coated with the electrode active material 4.

If continuously progressing through a roll-to-roll process, the secondary battery electrodes 1 and 2 may be notched while passing through the apparatus 100 for notching a secondary battery electrode. The secondary battery electrodes 1 and 2 may extend in a direction parallel to a traveling direction. Hereinafter, a direction parallel to longitudinal directions of the secondary battery electrodes 1 and 2 is referred to as a first direction, a direction perpendicular to the first direction and parallel to width directions of the secondary battery electrodes 1 and 2 is referred to as a second direction, and a direction perpendicular to the first and second directions is referred to as a third direction.

The secondary battery electrodes 1 and 2 may each include a composite portion 5 in which the electrode plate 3 and the electrode active material 4, with which the electrode plate 3 may be coated, overlap, and an uncoated portion 6 which may not be coated with the electrode active material 4 and thus the electrode plate 3 may be exposed. The uncoated portion 6 may be at one or both ends of each of the secondary battery electrodes 1 and 2 in the second direction.

A plurality of wrinkles 8 formed during a rolling and curing process of the electrode active material 4 may be distributed on the secondary battery electrode 1 before loading into the apparatus 100 for notching a secondary battery electrode, that is, on the uncoated portion 6 of the secondary battery electrode 1 before being notched. The wrinkles 8 may be mainly in a portion of the uncoated portion 6 close to a boundary between the composite portion 5 and the uncoated portion 6.

A flat surface 106 on which the secondary battery electrodes 1 and 2 may be supported and a stepped punch hole 108 which may be recessed in the flat surface 106 may be formed in the die 105. The stepped punch hole 108 may be formed at a point which overlaps the uncoated portion 6 in the third direction and may be aligned with the punch 115. The apparatus 100 for notching a secondary battery electrode may further include a die support base 102 for fixing and supporting the die 105.

The composite portion stripper 120 may move toward the die 105 and may press the composite portion 5 into close contact, i.e., direct contact, with the die 105. The composite portion stripper 120 may be a rigid body and may be a block with a substantially rectangular parallelepiped shape. The composite portion stripper 120 may be positioned to overlap the composite portion 5 in the third direction.

If the composite portion stripper 120 moves toward the die 105 in the third direction in a state in which the secondary battery electrode 1, which may not be notched, may be positioned between the die 105 and the composite portion stripper 120, one side surface of the composite portion 5 may be brought into close contact with the flat surface 106 of the die 105, and the other side surface of the composite portion 5 may be brought into close contact with a surface of the composite portion stripper 120 facing the composite portion 5 so that the composite portion 5 may be fixed between the die 105 and the composite portion stripper 120.

The uncoated portion stripper 130A may move toward the die 105 and may press the uncoated portion 6 into close contact with the die 105. If the uncoated portion stripper 130A moves toward the die 105 in the third direction in a state in which the secondary battery electrode 1, which may not be notched, may be positioned between the die 105 and the uncoated portion stripper 130A, one side surface of the uncoated portion 6 may be brought into close contact with the flat surface 106 of the die 105, and the other side surface of the uncoated portion 6 may be brought into close contact with a surface of the uncoated portion stripper 130A facing the uncoated portion 6 so that the uncoated portion 6 may be fixed between the die 105 and the uncoated portion stripper 130A.

In an implementation, a portion of the uncoated portion 6, that is, a portion overlapping the stepped punch hole 108 and the punch 115 in the third direction, may not be fixed by the flat surface 106 and the uncoated portion stripper 130A.

The uncoated portion stripper 130A may be a rigid body and may include a stripper block 131 with a substantially rectangular parallelepiped shape, and an elastic pad 140 coupled to and supported on a side surface of the stripper block 131 facing the uncoated portion 6. The elastic pad 140 may be formed of, e.g., an elastic material such as rubber or a foam resin and may be elastically deformed to make surface contact with the uncoated portion 6 if the uncoated portion 6 is fixed between the die 105 and the uncoated portion stripper 130A.

The uncoated portion stripper 130A may be a pair of uncoated portion strippers 130A. The pair of uncoated portion strippers 130A may be spaced apart from each other in the first direction parallel to the longitudinal directions of the secondary battery electrodes 1 and 2. The pair of uncoated portion strippers 130A may be adjacent to each other in the second direction parallel to the width directions of the secondary battery electrodes 1 and 2.

The punch 115 may move toward the die 105 to cut the uncoated portion 6. The punch 115 may be positioned to be aligned with the stepped punch hole 108 in the third direction. If the punch 115 moves in the third direction so as to be inserted into stepped punch hole 108 immediately after the composite portion 5 may be fixed between the die 105 and the composite portion stripper 120, and the uncoated portion 6 may be fixed between the die 105 and the pair of uncoated portion strippers 130A, a portion of the uncoated portion 6 may be cut by an edge 116 of an outer periphery of the punch 115 and separated from the secondary battery electrode 1.

In this way, the portion separated from the secondary battery electrode 1 may become scrap 14 for disposal. The remaining portion of the uncoated portion 6, which may not be cut by the punch 115, may become a tab 11. In FIGS. 1, 2, and 6, the punch 115 may be positioned between the pair of uncoated portion strippers 130A, but this is merely an example. In an implementation, if the secondary battery electrode notching apparatus is provided with only one uncoated portion stripper, the punch 115 may be positioned adjacent to the uncoated portion stripper in the first direction.

The apparatus 100 for notching a secondary battery electrode may further include a punch support base 111, a composite portion stripper support spring 127, a composite portion stripper support pillar 125, an uncoated portion stripper support spring 152, and an uncoated portion stripper support pillar 150. The punch support base 111 may support the composite portion stripper 120, the uncoated portion stripper 130A, and the punch 115.

The punch 115 may be fixedly coupled to a side surface of the punch support base 111 facing the die 105. The punch support base 111 may support the composite portion stripper 120 through the composite portion stripper support pillar 125 and support the uncoated portion stripper 130A through the uncoated portion stripper support pillar 150.

In order to change a gap between the punch support base 111 and the composite portion stripper support pillar 125, one end portion of the composite portion stripper support pillar 125 may be fixedly coupled to the composite portion stripper 120, and the other end portion thereof may be supported on the punch support base 111 so as to be movable in the third direction with respect to the punch support base 111.

In order to change a gap between the punch support base 111 and the uncoated portion stripper support pillar 150, one end portion of the uncoated portion stripper support pillar 150 may be fixedly coupled to the stripper block 131 of the uncoated portion stripper 130A, and the other end portion thereof may be supported on the punch support base 111 so as to be movable in the third direction with respect to the punch support base 111.

The composite portion stripper support spring 127 may be between the composite portion stripper 120 and the punch support base 111 to support the composite portion stripper 120 to be elastically movable in the third direction with respect to the punch support base 111. The composite portion stripper support spring 127 may be, e.g., a coil spring wound around the composite portion stripper support pillar 125.

The uncoated portion stripper support spring 152 may be between the uncoated portion stripper 130A and the punch support base 111 to support the uncoated portion stripper 130A to be elastically movable in the third direction with respect to the punch support base 111. The uncoated portion stripper support spring 152 may be, e.g., a coil spring wound around the uncoated portion stripper support pillar 150.

The apparatus 100 for notching a secondary battery electrode may include a first mold 101 and a second mold 110, which approach and recede from each other in the third direction. The first mold 101 may include the die support base 102 and the die 105.

The second mold 110 may include the punch support base 111, the punch 115, the composite portion stripper 120, the composite portion stripper support pillar 125, the composite portion stripper support spring 127, the uncoated portion stripper 130A, the uncoated portion stripper support pillar 150, and the uncoated portion stripper support spring 152.

The apparatus 100 for notching a secondary battery electrode may be configured such that the first mold 101 may not move and only the second mold 110 may move in the third direction, or only the first mold 101 may move in the third direction and the second mold 110 may not move. Alternatively, the first mold 101 and the second mold 110 may be configured to simultaneously move in opposite directions, thereby approaching or receding from each other.

In a state in which the first mold 101 and the second mold 110 may be spaced apart from each other, a composite portion contact surface of the composite portion stripper 120 may protrude the most toward the die 105 in the third direction compared with the other components included in the second mold 110, an uncoated portion contact surface of the uncoated portion stripper 130A may protrude less toward the die 105 in the third direction compared to the composite portion contact surface of the composite portion stripper 120, and the edge 116 of the punch 115 may protrude less toward the die 105 in the third direction compared to the uncoated portion contact surface of the uncoated portion stripper 130A.

As shown in FIGS. 2 to 5, a thickness TP1 of the elastic pad 140 may become thinner as it moves away from the composite portion stripper 120 in the second direction parallel to the width directions of the secondary battery electrodes 1 and 2. Thus, a surface of the elastic pad 140 facing the flat surface 106 of the die 105 may be inclined away from the flat surface 106 in the third direction as it moves away from the composite portion stripper 120 in the second direction.

In addition, a thickness TP2 of the elastic pad 140 may become thinner as it moves away from a center 145 of the uncoated portion stripper 130A to which the elastic pad 140 may be attached in the first direction parallel to the longitudinal directions of the secondary battery electrodes 1 and 2. In other words, the thickness TP2 of the elastic pad 140 may become thinner as it moves away from the center 145 of the uncoated portion stripper 130A in a front-rear direction. Thus, the surface of the elastic pad 140 facing the flat surface 106 of the die 105 may be inclined away from the flat surface 106 in the third direction as it moves away from the center 145 of the uncoated portion stripper 130A in the front-rear direction.

In a state in which the first mold 101 and the second mold 110 may be spaced apart from each other, the secondary battery electrode 1 may enter between the first mold 101 and the second mold 110 in a roll-to-roll manner and be supported on the die 105. If the first mold 101 and the second mold 110 approach each other, the composite portion stripper 120 presses the composite portion 5 of the secondary battery electrode 1 so that the composite portion 5 may first come into close contact with the flat surface 106 and supported on the flat surface 106.

Next, as the first mold 101 and the second mold 110 become closer, that is, as the punch support base 111 moves closer to the die 105, the uncoated portion stripper 130A may press the uncoated portion 6 of the secondary battery electrode 1 so that the uncoated portion 6 may come into close contact with the flat surface 106 and supported on the flat surface 106. In this case, as the punch support base 111 approaches the die 105, the uncoated portion stripper 130A may press the uncoated portion 6 after the composite portion stripper 120 presses the composite portion 5.

As shown in FIGS. 7 and 8, if the uncoated portion stripper 130A presses the uncoated portion 6, the uncoated portion stripper 130A may further protrude toward the die 105 by as much as a distance PS obtained by subtracting a thickness TH2 of the uncoated portion 6 from a thickness TH1 of the composite portion 5, compared to the composite portion stripper 120. Thus, as shown in FIGS. 7 and 8, a portion of the uncoated portion 6 close to the boundary between the composite portion 5 and the uncoated portion 6 may be bent toward the flat surface 106 of the die 105.

As described above, since the thickness TP1 of the elastic pad 140 becomes thinner as it moves away from the composite portion stripper 120 in a direction parallel to the width direction of electrode 1 of a secondary battery, that is, in the second direction, if the uncoated portion 6 is pressed by the uncoated portion stripper 130A, a portion of the elastic pad 140 closest to the composite portion stripper 120 may be first brought into contact with a portion of the uncoated portion 6 closest to the composite portion 5 to elastically press the uncoated portion 6. In addition, an area of the uncoated portion 6 pressed by the elastic pad 140 may gradually spread toward the end of the uncoated portion 6 in the second direction.

Thus, the wrinkles 8 in the uncoated portion 6 may move in the width direction of the secondary battery electrode 1 within the uncoated portion 6, that is, in a direction away from the composite portion stripper 120 in the second direction so that the wrinkles 8 may disappear at the end of the uncoated portion 6 in the second direction. For example, after the wrinkles 8 move away from the composite portion stripper 120 in the second direction there may be no wrinkles 8 at the end of the uncoated portion 6 in the second direction.

The wrinkles 8 shown as dashed lines in FIG. 8 represent shapes of the wrinkles 8 before being pressed by the elastic pad 140. The uncoated portion 6 in which the wrinkles 8 disappear in the second direction after the uncoated portion 6 may be pressed by the elastic pad 140, is shown as a solid line. Since the uncoated portion 6 may be pressed by the elastic pad 140 and the wrinkles 8 may be straightened, the uncoated portion 6 may become slightly longer in the second direction than before being pressed.

As described above, since the thickness TP2 of the elastic pad 140 may become thinner as it moves away from the center 145 of the uncoated portion stripper 130A in the direction parallel to the longitudinal direction of the secondary battery electrode 1, that is, the first direction, if the uncoated portion 6 is pressed by the uncoated portion stripper 130A, the center 145 may be first brought into contact with the uncoated portion 6 to press the uncoated portion 6.

In addition, the area of the uncoated portion 6 pressed by the elastic pad 140 may spread in the front-rear direction from the center 145 in the first direction. Thus, the wrinkles 8 formed in the uncoated portion 6 may move to an area SA overlapping the punch 115 in the third direction.

The area of the uncoated portion 6 may be divided into the scrap area SA and a tab area TA in the first direction. The scrap area SA may be an area in which the scrap 14, which may be cut and removed by the punch 115, may be formed, and the tab area TA may be an area in which the tab 11, remaining in the secondary electrode 2 after the notching process, may be formed because it may not be cut and removed by the punch 115. In other words, as the uncoated portion 6 may be pressed by the elastic pad 140, the wrinkles 8 may move to the scrap area SA.

The wrinkles 8 shown as dashed lines in FIG. 7 represent the shapes of the wrinkles 8 before being pressed by the elastic pad 140. The wrinkles 8 shown as solid lines in FIG. 7 represent wrinkles 8 which may move away from the center 145 to the scrap area SA in the first direction after being pressed by the elastic pad 140. As the wrinkles 8 in the tab area TA may move to the scrap area SA, the number of wrinkles 8 in the scrap area SA may be greater than before the secondary battery electrode 1 enters the apparatus 100 for notching a secondary battery electrode.

Next, as the first mold 101 and the second mold 110 become closer, that is, as the punch support base 111 approaches the die 105, the punch 115 may cut the uncoated portion 6 in a state in which the uncoated portion 6 may be pressed by the uncoated portion stripper 130A. The punch 115 may move in the third direction to cut the uncoated portion 6 in order to allow the edge 116 of the punch 115 to be accommodated in the stepped punch hole 108. The portion of the uncoated portion 6 cut by the edge 116 may become the scrap 14 for disposal and may be separated and removed from the secondary battery electrode 1.

As described above, due to the pressure of the elastic pad 140, since many wrinkles 8 may be in the scrap area SA and the wrinkles 8 may be removed from the tab area TA, the scrap 14 for disposal may be removed from the secondary battery electrode 1 so that no or almost no wrinkles may remain or may be present on the notched secondary battery electrode 2.

Figure 11:
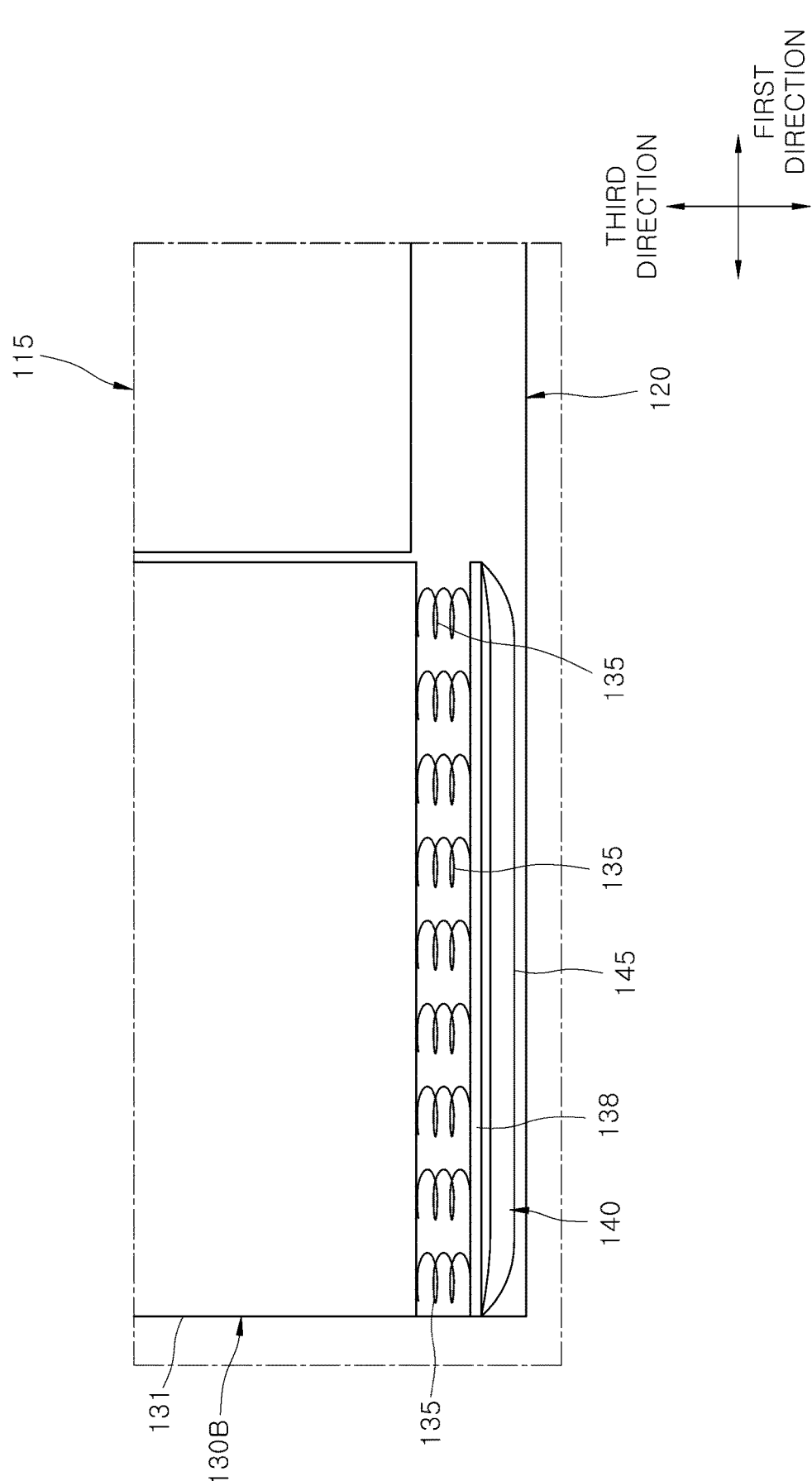
FIG. 11 is an enlarged front view of an uncoated portion stripper of a secondary battery electrode notching apparatus according to a second embodiment of the present disclosure and is a view corresponding to FIG. 3 in the first embodiment of the present disclosure.
Figure 12:
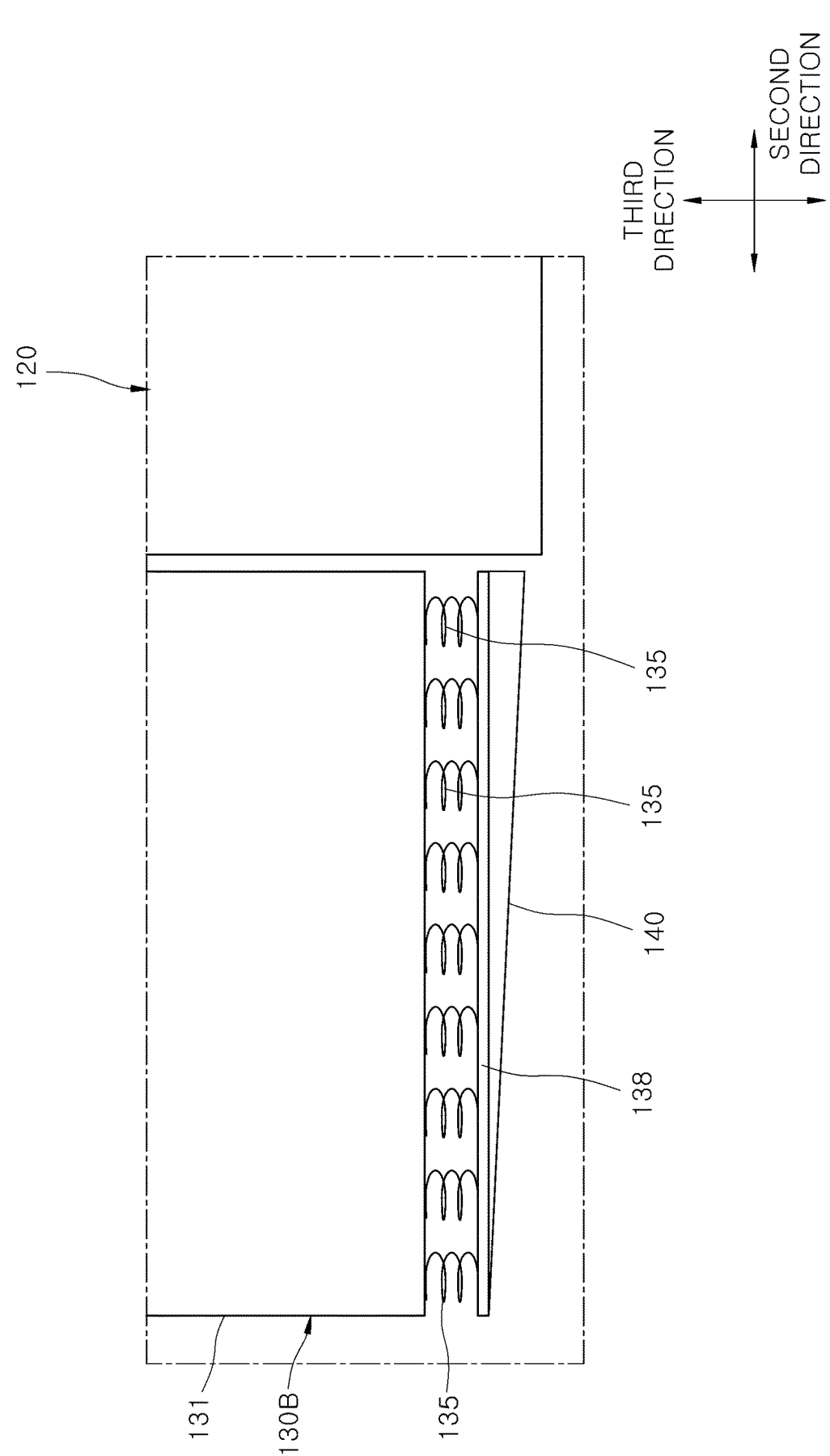
FIG. 12 is an enlarged side view of the uncoated portion stripper of the secondary battery electrode notching apparatus according to the second embodiment of the present disclosure and is a view corresponding to FIG. 5 in the first embodiment of the present disclosure.

FIG. 11 is an enlarged front view of an uncoated portion stripper of a secondary battery electrode notching apparatus according to a second embodiment of the present disclosure and is a view corresponding to FIG. 3 in the first embodiment of the present disclosure, and FIG. 12 is an enlarged side view of the uncoated portion stripper of the secondary battery electrode notching apparatus according to the second embodiment of the present disclosure and is a view corresponding to FIG. 5 in the first embodiment of the present disclosure.

Referring to FIGS. 11 and 12, the secondary battery electrode notching apparatus according to the second embodiment of the present disclosure may include all of the components included in the apparatus 100 for notching a secondary battery electrode according to the first embodiment of the present disclosure described with reference to FIGS. 1 to 10 and may further include a spring 135 and a reinforcement plate 138 in addition to all these components. Therefore, in describing the apparatus 100 for notching a secondary battery electrode according to the second embodiment of the present disclosure, since the same components as those included in the apparatus 100 for notching a secondary battery electrode according to the first embodiment of the present disclosure have already been described, duplicate descriptions thereof will be omitted and different components will be described.

Referring to FIGS. 7, 8, 11, and 12, an uncoated portion stripper 130B included in the secondary battery electrode notching apparatus according to the second embodiment of the present disclosure may include a stripper block 131 that may have a rigid body, an elastic pad 140 formed of an elastic material and elastically deformed to make surface contact with an uncoated portion 6, a spring 135 interposed between the stripper block 131 and the elastic pad 140, and an elastic pad reinforcement plate 138 which may support one side of the spring 135 and may be attached to the elastic pad 140.

The spring 135 may be provided as a plurality of springs 135, and the plurality of springs 135 may be spaced apart from each other. The spring 135 may be a coil spring. Since the spring 135 may be between the elastic pad 140 and the stripper block 131, even if a thickness TH1 of a composite portion 5 (see FIG. 8) is thick, wrinkles 8 in the uncoated portion 6 may be straightened without replacing the uncoated portion stripper 130B or the elastic pad 140.

The apparatus 100 for notching a secondary battery electrode according to the present disclosure described above may remove the wrinkles formed in the uncoated portion 6 of a secondary battery electrode 1 while notching the secondary battery electrode 1. Thus, adhesion may be improved at welded portions between a plurality of tabs 11 formed by notching and welded portions between a collector and the tabs 11, thereby improving the productivity of good quality secondary batteries.

In addition, since good welding quality may be maintained even if an output for welding between the plurality of tabs 11 and between the collector and the tabs 11 may be reduced, the production cost of the secondary battery may be reduced by reducing energy consumption for welding, and welding defects due to foreign materials generated during welding may be suppressed, thereby further improving the productivity of good quality secondary batteries.

By way of summation and review, the secondary battery may include an electrode assembly provided with a pair of electrodes, that is, a positive electrode and a negative electrode, and a separator interposed between the pair of electrodes. A secondary battery electrode may include, e.g., an electrode plate including a thin metal foil, and a cured electrode active material with which one side or both sides of the electrode plate may be coated.

In a secondary battery electrode, an area not coated with an electrode active material may be referred to as an uncoated portion, and an area coated with the electrode active material may be referred to as a composite portion. In the process of performing rolling in order to decrease a thickness of the electrode active material, with which the electrode plate may be coated, and curing the rolled electrode active material, wrinkles may be formed in the uncoated portion.

Even if an electrode on which the wrinkles may be formed is notched to form a tab, the wrinkles may still remain. Due to the wrinkles remaining on the electrode, adhesion at a welded portion between tabs and a welded portion between the tab and a collector may be degraded, and thus welding defects may occur.

An aspect of embodiments of the present disclosure may be directed to a secondary battery electrode notching apparatus, which may remove wrinkles formed in an uncoated portion of a secondary battery electrode while notching the secondary battery electrode in order to form a tab.

Wrinkles formed in the uncoated portion of the secondary battery electrode may be removed while notching the secondary battery electrode. Thus, adhesion may be improved at welded portions between a plurality of tabs formed by notching and welded portions between a collector and the tabs, thereby improving the productivity of good quality secondary batteries.

Since good welding quality may be maintained even if an output for welding between the plurality of tabs and between the collector and the tabs may be reduced, the production cost of the secondary battery may be reduced by reducing energy consumption for welding, and welding defects due to foreign materials generated during the welding may be suppressed, thereby further improving the productivity of good quality secondary batteries.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery electrode notching apparatus, comprising:
   a die configured to support a secondary battery electrode including a composite portion coated with an electrode active material and an uncoated portion not coated with the electrode active material;
   a composite portion stripper configured to move toward the die and press the composite portion into close contact with the die;
   an uncoated portion stripper configured to move toward the die and press the uncoated portion into close contact with the die, the uncoated portion stripper including an elastic pad formed of an elastic material and configured to elastically deform to make surface contact with the uncoated portion; and
   a punch configured to move toward the die and cut the uncoated portion so that scrap for disposal is formed from the uncoated portion,
   wherein a thickness of the elastic pad becomes thinner the further away the elastic pad is from the composite portion stripper in a direction parallel to a width direction of the secondary battery electrode.

2. The secondary battery electrode notching apparatus of claim 1, wherein the thickness of the elastic pad becomes thinner the further away the elastic pad is from a center of the uncoated portion stripper in a direction parallel to a longitudinal direction of the secondary battery electrode.

3. The secondary battery electrode notching apparatus of claim 1, wherein the uncoated portion stripper further includes a stripper block, which is a rigid body, and a spring interposed between the stripper block and the elastic pad.

4. The secondary battery electrode notching apparatus of claim 3, wherein:
   the spring includes a plurality of springs;

the plurality of springs are spaced apart from each other; and
   the spring includes a coil spring.

5. The secondary battery electrode notching apparatus of claim 4, wherein the uncoated portion stripper further includes an elastic pad reinforcement plate supporting one side of the plurality of springs and attached to the elastic pad.

6. The secondary battery electrode notching apparatus of claim 1, wherein:
   the uncoated portion stripper includes a pair of uncoated portion strippers;
   the pair of uncoated portion strippers are spaced apart from each other in a direction parallel to a longitudinal direction of the secondary battery electrode; and
   the punch is between the pair of uncoated portion strippers.

7. The secondary battery electrode notching apparatus of claim 1, further comprising a punch support base supporting the composite portion stripper, the uncoated portion stripper, and the punch.

8. The secondary battery electrode notching apparatus of claim 7, further comprising:
   a composite portion stripper support spring between the composite portion stripper and the punch support base; and
   an uncoated portion stripper support spring between the uncoated portion stripper and the punch support base.

9. The secondary battery electrode notching apparatus of claim 8, wherein, as the punch support base approaches the die, the uncoated portion stripper presses the uncoated portion after the composite portion stripper presses the composite portion.

10. The secondary battery electrode notching apparatus of claim 9, wherein, if the uncoated portion stripper presses the uncoated portion, the uncoated portion stripper further protrudes toward the die by as much as a distance obtained by subtracting a thickness of the uncoated portion from a thickness of the secondary battery electrode, compared to the composite portion stripper.

11. The secondary battery electrode notching apparatus of claim 9, wherein, as the punch support base approaches the die, the punch is configured to cut the uncoated portion in a state in which the uncoated portion is pressed by the uncoated portion stripper.

12. The secondary battery electrode notching apparatus of claim 1, wherein a flat surface on which the secondary battery electrode is supported is included on the die, and a stepped punch hole aligned with the punch and recessed in the flat surface is included in the die.

13. A method of notching a secondary battery electrode, the method comprising:
   supplying a secondary battery electrode including a composite portion coated with an electrode active material and an uncoated portion not coated with the electrode active material to a die portion of a notching apparatus;
   operating a composite portion stripper of the notching apparatus such that the composite portion stripper moves toward the die and presses the composite portion into close contact with the die;
   operating an uncoated portion stripper of the notching apparatus including an elastic pad formed of an elastic material such that the uncoated portion stripper moves toward the die, presses the uncoated portion into close contact with the die, and thereby elastically deforms the elastic pad while making surface contact with the uncoated portion; and operating a punch of the notching apparatus such that the punch moves toward the die and cuts the uncoated portion so that scraps for disposal are formed from the uncoated portion, wherein a thickness of the elastic pad becomes thinner the further away the elastic pad is from the composite portion stripper in a direction parallel to a width direction of the secondary battery electrode.

14. A secondary battery electrode notching apparatus, comprising:

a die configured to support a secondary battery electrode including a composite portion coated with an electrode active material and an uncoated portion not coated with the electrode active material;

a composite portion stripper configured to move toward the die and press the composite portion into close contact with the die;

an uncoated portion stripper configured to move toward the die and press the uncoated portion into close contact with the die, the uncoated portion stripper including an elastic pad formed of an elastic material and configured to elastically deform to make surface contact with the uncoated portion; and a punch configured to move toward the die and cut the uncoated portion so that scrap for disposal is formed from the uncoated portion, wherein a thickness of the elastic pad becomes thinner the further away the elastic pad is from a center of the uncoated portion stripper in a direction parallel to a longitudinal direction of the secondary battery electrode.

\* \* \* \* \*